UNITED STATES PATENT OFFICE.

RICHARD A. WYLAND, OF SMITH CENTER, KANSAS.

COMPOUND FOR DIPPING CATTLE.

No. 916,519.   Specification of Letters Patent.   Patented March 30, 1909.

Application filed August 22, 1907. Serial No. 389,732.

*To all whom it may concern:*

Be it known that I, RICHARD A. WYLAND, a citizen of the United States, residing at Smith Center, in the county of Smith, State of Kansas, have invented certain new and useful Improvements in Compounds for Dipping Cattle; and I do hereby declare the following to be a full, clear, and exact description of the invention, such as will enable others skilled in the art to which it appertains to make and use the same.

This invention relates to compounds for dipping cattle for the purpose of killing lice, and curing mange and all skin diseases and has for its object to provide an effective compound of this class and for this purpose, which will be cheap to make and safe to use.

As the result of continued experiments I have found that a compound having as its ingredients, coal tar, coal oil, sulfur, ferrous sulfate and carbolic acid, will produce very satisfactory results and that it will kill insects of all kinds which are found upon cattle and other domestic animals and will furthermore cure all kinds of skin diseases with which such animals are affected.

In compounding the dip I use the abovementioned ingredients in about the following proportions: water fifty-two gallons, coal oil two gallons, sulfur one pound, coal tar one-half gallon, and, carbolic acid two ounces, and, ferrous sulfate one pound. I have found these proportions to be the most satisfactory, but it will be understood, of course, that the same ingredients may be used in other proportions if found to be expedient or to suit varying conditions, such as the trouble to be overcome or the species of animal to be treated. In order that the compound may be strengthened the proportion of water is of course lessened and the converse is true when it is desired to weaken the compound.

What is claimed, is,

A cattle dipping compound comprising a mixture of two gallons of coal oil, one pound of sulfur, one-half gallon of coal tar, two ounces of carbolic acid, one pound of ferrous sulfate, and fifty-two gallons of water.

In testimony whereof, I affix my signature, in presence of two witnesses.

RICHARD A. WYLAND.

Witnesses:
CHARLES W. HOBBS,
CARL LOWERY.